United States Patent Office 3,541,838
Patented Nov. 24, 1970

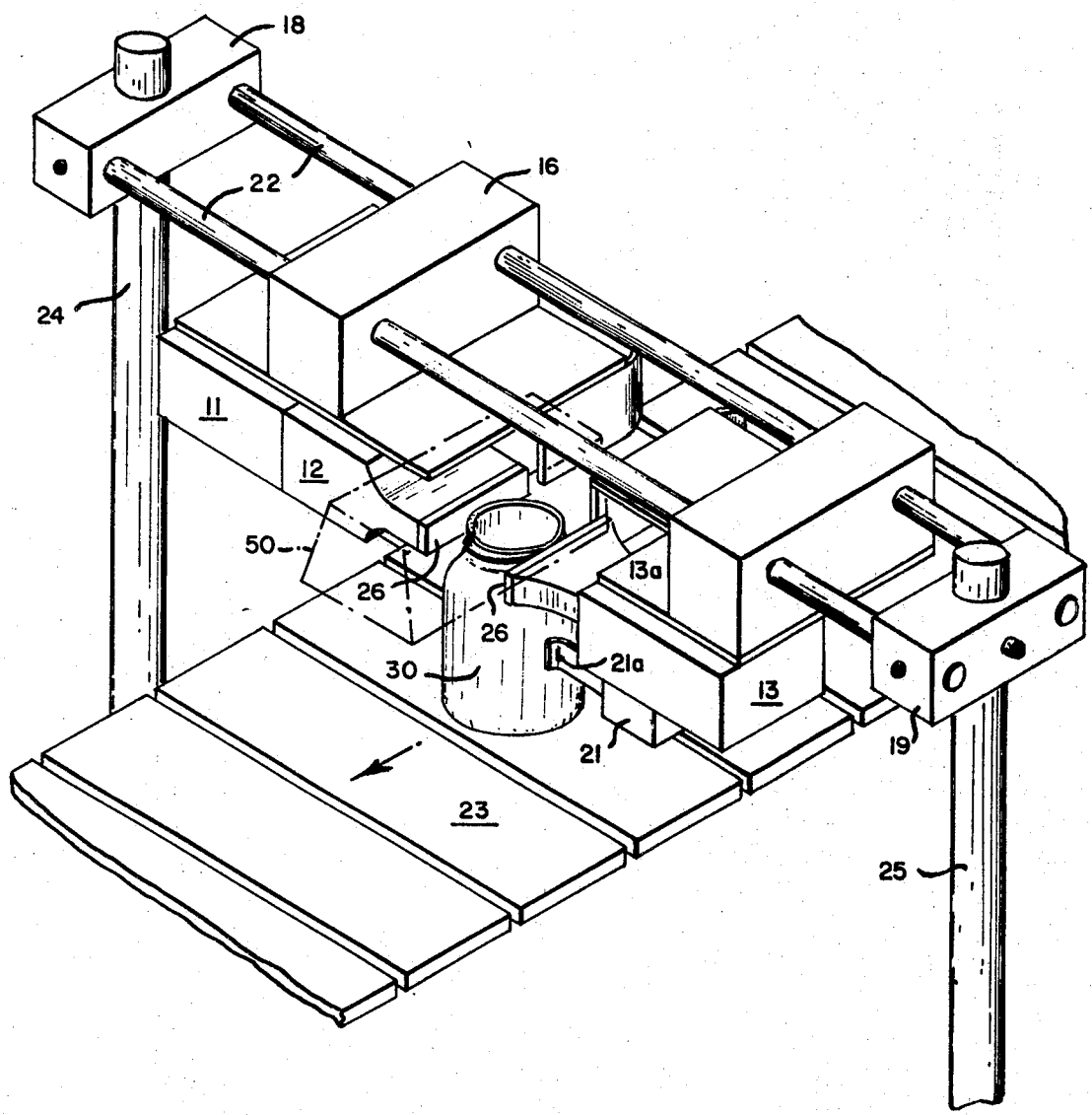

3,541,838
METHODS AND APPARATUS FOR TESTING GLASSWARE
John N. Antonevich, Jamestown, N.Y., assignor to Blackstone Corporation, a corporation of New York
Filed Aug. 1, 1968, Ser. No. 749,533
Int. Cl. G01n 3/38, 3/32
U.S. Cl. 73—12      6 Claims

ABSTRACT OF THE DISCLOSURE

A method of detecting articles containing defects such as hair line cracks, fire checks comprises subjecting ware to destructive ultrasonic impact stresses. An apparatus is provided having an ultrasonic transducer and an impact generator adjacent a conveyor adapted to deliver an article to be tested into contact with the impact generator which in turn drives the article into the ultrasonic transducer.

---

This invention relates to methods and apparatus for testing glassware and particularly to methods of testing glassware for defects such as cracks, fire checks and similar fracture flaws by subjecting the ware to ultrasonic impact stresses and apparatus by means of which such glassware may be destructively tested.

Products which involve glass bodies such as electron tubes and glass jars for food preservation frequently contain minutes cracks or fire checks which cannot readily be detected by visual inspection or by any ordinary means. Inspection of such objects is accordingly a major problem in the industry. Many efforts to solve this problem have been attempted by various elaborate and time consuming methods such as pressurizing in the case of hollow vessels and measuring the leakage, by scanning and measuring light refractions and by testing end products after a specified period of shelf life or a specified period of operation. None of these methods has, however, proven to be entirely satisfactory.

In the food industry cracks or fire checks in jars are dangerous in that they can result in spoilage which may in turn cause illness to the consumer or they may result in fractures during opening which lacerate or injure the consumer. In application where glass to metal seals are involved such as metal seals in vacuum tubes or hermetically sealed components, these defects may result in a failure of the component at a critical time in the operation of a system of which they are a part. At the present time the most advanced inspection techniques of the glass industry has reduced in field jar rejects or failures to about 5%.

I have developed a method and apparatus for inspection which reduces in field rejects of jars, for example, to less than 1% without loss of fracture free jars as compared to the previous 5%. In the case of defective seals my process and apparatus will shatter or open up the defective seal so that it can be immediately found without significant loss of good seals.

Preferably I provide a method which comprises the subjecting of glassware to be tested to ultrasonic impact stress. I provide preferably an apparatus comprising an ultrasonic transducer, a velocity transformer driven by said ultrasonic transducer, an impact generator such as an impact generating transducer, and a conveyor for articles to be tested adjacent said transformer and impact generating transducer adapted to deliver an article to be tested into contact with the impact generating transducer which impacts the article against the face of the transformer. Preferably the face of the transformer and impact generating transformer are fitted with hard wear surfaces or shoes made of a material such as tungsten carbide or Latrobe Steel Company's BR 4 abrasion resistant steel. The velocity transformer and impact generating transducer are preferably placed on opposite sides of the article to be tested. A sensing device, such as a proximity switch, is preferably arranged adjacent the conveyor to energize each of the transducers only when an article to be tested is delivered to them so as to avoid continuous operation of the apparatus. The velocity transformer and associated ultrasonic transducer are preferably adapted to produce high ultrasonic impact velocities. The impact generating transducer is preferably a low frequency, moderately high displacement vibrator although it may be a pneumatic or hydraulic cylinder and piston or a solenoid. If the level of ultrasonic velocity is reduced the impact force required of the impact generating transducer is increased, increasing the degree of destruction.

In the foregoing general description of my invention I have set out certain objects, purposes and advantages. Other objects, purposes and advantages will be apparent from a consideration of the following description and the accompanying drawing which is an isometric view of an apparatus according to my invention.

In the drawing I have illustrated an ultrasonic transducer 11 fixed to and driving a velocity transformer 12. The assembly of transducer 11 and transformer 12 is mounted on a guide block 16 which is suspended on the traverse rods 22. The traverse rods 22 are mounted in vertical guide blocks 18 and 19 movable on vertical posts 24 and 25 on opposite sides of conveyor 23. A proximity switch 21 is suspended from the impact generating transducer with a sensing member 21a extending over conveyor 23 so as to be contacted by an article, such as jar 30, moving on the conveyor. Wear resistant shoes 26 are fitted on the transducer 13 and velocity transformer 12 for protection against wear and impact damage.

The operation of the apparatus of my invention is as follows. A jar 30 to be tested is placed on conveyor 23 and moved toward the transformer 12 and impact generating transducer 13 so as to pass between them and coming in contact with impact transducer 13 on its output member 13a. As jar 30 approaches the transducers it contacts sensing member 21a which actuates switch 21 and thereby energizes transducers 11 and 13 and transformer 12. The jar 30 passing between transformer 12 and transducer 13 is struck by the moving output member 13a of transducer 13 and driven against the vibrating velocity transformer 12. The concurrent impact and high velocity vibration results in the propagation of cracks originating in hair line cracks or fire checks in the jar lip. If no such defects are present the jar will pass on with the conveyor without damage. If the impact force generating device is one which produces high displacement with low clamped forces, it is obvious that defective jars will be fragmented or at least the lip portion carrying the defect will be destroyed. The extent of destruction is controlled by the velocity of member 13a on striking the jar 30 and the clamping force after impact. For high speed inspection, it is preferred that there is no clamping force after impact. Under such conditions a second sensor may be used down the line to activate a piston driven brush or ram to sweep the defective and destroyed jars or debris off the conveyor.

If it is desired to reduce or eliminate the hazard of shattered glass recourse to high ultrasonic velocities and very low impact forces such as those generated by bumping the jars against the velocity transformer in passing on the conveyor may be used. In such an arrangement the hair line defects and fire checks will be opened up and a conventional device for detecting grossly cracked jars can be used down the line from the transducer to activate a mechanism for sweeping defective jars off the conveyor.

My invention also contemplates the use of a shield 50 (in chain line), if desired, at the test station covering the opening of jars in front of and behind the test station and a plenum incorporating a blower or vacuum system to remove fine glass fragments from the test area.

While I have illustrated and described certain presently preferred practices and embodiments of my invention in the foregoing specification, it will be understood that this invention may be otherwise embodied within the scope of the following claims.

I claim:
1. A method of testing glassware for fracture flaws comprising the steps of substantially simultaneously subjecting glassware to be tested to both ultrasonic and impact stresses wherein the glassware is impacted to induce an impact stress and then moved sharply into contact with a member vibrating at ultrasonic frequencies in the range of 15 kHz. to 1 mHz. to apply ultrasonic stress.

2. An apparatus for detecting fracture flaws in glassware comprising an ultrasonic transducer, an impact generator and a conveyor for articles to be tested adjacent said transducer and generator adapted to deliver an article to be tested into contact with the generator which drives the article to be tested into the ultrasonic transducer and means to energize said transducer.

3. An apparatus as claimed in claim 2 wherein the ultrasonic transducer is provided with a velocity transformer on one side of the conveyor and the impact generator is on the opposite side of the conveyor whereby the article to be tested passes between them.

4. An apparatus as claimed in claim 3 wherein the impact generator is a low frequency vibrator.

5. An apparatus as claimed in claim 2 wherein sensing means are provided adjacent the conveyor to be contacted by an article to be tested and connections from said sensing means to said energizing means and said generator for actuating said energizing means and said generator each time an article contacts said sensing means.

6. A method of testing glassware for fracture flaws which comprises the steps of subjecting said glassware to an impact, moving said glassware into contact with a member vibrating at ultrasonic frequencies and maintaining said glassware in contact with said member during the duration of the impact.

References Cited

UNITED STATES PATENTS

| | | | |
|---|---|---|---|
| 2,339,460 | 1/1944 | Cozzoli | 73—12 |
| 2,418,437 | 4/1947 | Vogt | 315—369 |
| 2,859,610 | 11/1958 | Dickey | 73—69 |
| 2,978,635 | 4/1961 | Oakes | 324—20 |
| 3,328,609 | 6/1967 | Clicques | 310—8.1 |

RICHARD C. QUEISSER, Primary Examiner

J. WHALEN, Assistant Examiner

U.S. Cl. X.R.

73—67